United States Patent
Bruck et al.

(10) Patent No.: US 9,101,997 B2
(45) Date of Patent: Aug. 11, 2015

(54) ASYMMETRIC HEAT SINK WELDING USING A PENETRATION ENHANCING COMPOUND

(75) Inventors: Gerald J. Bruck, Oviedo, FL (US); Brandon W. Shinn, Winter Park, FL (US)

(73) Assignee: Siemens Energy, Inc, Orlando, FL (US)

( * ) Notice: Subject to any disclaimer, the term of this patent is extended or adjusted under 35 U.S.C. 154(b) by 1667 days.

(21) Appl. No.: 12/208,519

(22) Filed: Sep. 11, 2008

(65) Prior Publication Data
US 2010/0059483 A1 Mar. 11, 2010

(51) Int. Cl.
*B23K 9/00* (2006.01)
(52) U.S. Cl.
CPC .................... *B23K 9/0026* (2013.01)
(58) Field of Classification Search
USPC ......... 219/60.2, 137, 75, 59.1, 60 R, 60 A, 61
See application file for complete search history.

(56) References Cited

U.S. PATENT DOCUMENTS

| | | | |
|---|---|---|---|
| 3,003,601 A * | 10/1961 | Ott | 403/270 |
| 3,769,489 A * | 10/1973 | Charlesworth | 219/60.2 |
| 4,066,861 A * | 1/1978 | Broodman | 219/61 |
| 4,221,263 A | 9/1980 | Meyer | |
| 4,302,657 A | 11/1981 | Turelli et al. | |
| 4,960,650 A | 10/1990 | Vigneron et al. | |
| 5,749,414 A | 5/1998 | Damsohn et al. | |
| 6,664,508 B1 | 12/2003 | Johnson et al. | |
| 6,707,005 B1 | 3/2004 | Johnson et al. | |
| 6,960,333 B2 * | 11/2005 | Blanda et al. | 423/376 |
| 7,241,961 B2 * | 7/2007 | Duret et al. | 219/61 |
| 2004/0074724 A1 * | 4/2004 | Bruck et al. | 188/378 |
| 2005/0034306 A1 | 2/2005 | Patberg et al. | |

FOREIGN PATENT DOCUMENTS

| | | | | |
|---|---|---|---|---|
| CN | 1555957 A | | 12/2004 | |
| DE | 19713701 A1 * | | 10/1997 | B23K 31/02 |
| EP | 1156278 A1 * | | 11/2001 | F23M 5/04 |
| FR | 2634577 A1 | | 1/1990 | |

* cited by examiner

*Primary Examiner* — Dana Ross
*Assistant Examiner* — Ayub Maye

(57) ABSTRACT

A method for welding a tube member to a tubesheet includes positioning an open end of a tube member adjacent to a first side of the tubesheet and with the tube member extending through the tubesheet past a second side of the tubesheet. A penetration enhancing compound is applied to an inner side of the tube member at a location adjacent to a junction between an outer side of the tube member and the tubesheet second side. An arc welding operation is performed at the location of the penetration enhancing compound to effect formation of a weld joint at the junction between the tube member outer side and the tubesheet second side.

17 Claims, 3 Drawing Sheets

ASYMMETRIC HEAT SINK WELDING USING A PENETRATION ENHANCING COMPOUND

FIELD OF THE INVENTION

The present invention relates to a method of welding and, more particularly, to welding of two components having asymmetrical heat sinking capabilities.

BACKGROUND OF THE INVENTION

In tube-type heat exchangers and other vessels used for industrial processes, the tubes extend between tubesheets and have their ends secured to the tubesheets. One fluid fills the cavity between the tubesheets and surrounds the outsides of the tubes, while another flows through the tubes, so that heat is transferred through the tube walls from the hotter fluid to the cooler fluid. Various procedures and equipment have been developed for fastening the tubes to the tubesheets.

In the typical heat exchanger, each tube extends through a separate hole in the tubesheet and has its end edge flush with a front face of the tubesheet. Here, the two are welded together so that the weld exists along the end edge of the tube. Since the weld is at the front face of the tubesheet, a small annular crevice exists between the outer surface of the tube wall and the surrounding surface of the tubesheet hole into which the tube fits. In some applications, particularly where the fluid that circulates amongst the tubes is a liquid, the fluid enters the crevices surrounding the tubes. Where the liquid is water, chloride crevice stress corrosion may occur in the portion of the two components forming the crevice, particularly in the tubesheet hole and tube wall, resulting in cracking and consequent leakage between the tube and the tubesheet.

Various solutions have been suggested for addressing the problems associated with the crevice between the tubesheet and the tubes. U.S. Pat. No. 4,221,263 describes a solution including welding the tubes to the back face of the tubesheet. This may be achieved by welding around the periphery of each tube from the exterior of the tube, typically requiring specially bent electrodes to reach the confined spaces around the closely packed tubes. Alternatively, the welding may be performed from within the tubes using a welding head to reach within the open end of the tubes to form circular welds which must completely penetrate the tube walls.

The difficulty of arc welding a tube to a tubesheet from within the tube is increased by asymmetry in the heat sinking ability along the length of the tube adjacent to the location where the tube extends past the back face of the tubesheet. In particular, the portion of the tube extending past the tubesheet has a much lower heat sinking capacity than the portion of the tube extending within the tubesheet such that it has proven difficult to conduct sufficient heat through the tube to the tubesheet to create a weld without the heat melting through and creating a hole in the tube. On the other hand, if a lower power is applied such that the tube is not melted away, the power may be insufficient to penetrate the tube to create a weld connection.

SUMMARY OF THE INVENTION

The present invention provides a method for performing a weld to join two components at a location having asymmetrical heat sinking capabilities.

In accordance with one aspect of the invention, a method is provided for welding two members at a location having asymmetrical heat sinking characteristics, the method comprising: associating a first member with a second member, the second member defining a first area and a second area in relation to the first member, the first area having a greater heat sinking capability than the second area; the first member having a welding side and a contact side, the contact side being in close association with an adjacent surface of the second member in the first area; applying a penetration enhancing compound to the first member welding side adjacent to a junction location between the first area and the second area; and heating the first member at the penetration enhancing compound by performing an arc welding from the first member welding side to effect formation of a weld joint between the first member contact side and the adjacent surface of the second member.

In accordance with another aspect of the invention, a method is provided for welding a tube member to a tubesheet, the method comprising: associating the tube member with a hole through the tubesheet; the tube member having an inner welding side and an outer contact side, the outer side being in close association with an adjacent surface defined by the hole in the tubesheet; applying a penetration enhancing compound to the tube member inner side; and heating the tube member at the penetration enhancing compound by performing an arc welding from the tube member inner side to effect formation of a weld joint between the tube member outer side and the adjacent surface of the tubesheet.

In accordance with a further aspect of the invention, a method is provided for welding a tube member to a tubesheet, the method comprising: the tubesheet having a first side and a second side, and a hole extending between the first and second sides; the tube member including an open end and having an inner welding side and an outer contact side; associating the tube member with the tubesheet by positioning the tube member open end substantially flush with the tubesheet first side and with the tube member extending through the tubesheet past the second side; applying a penetration enhancing compound to the tube member inner side at a location adjacent to a junction between the tube member outer side and the tubesheet second side; locating a non-consumable electrode through the open end of the tube member to a location adjacent to the junction between the tube member outer side and the tubesheet second side; and heating the tube member by using the electrode to perform an arc welding from the tube member inner side to effect formation of a weld joint at the junction between the tube member outer side and the tubesheet second side.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
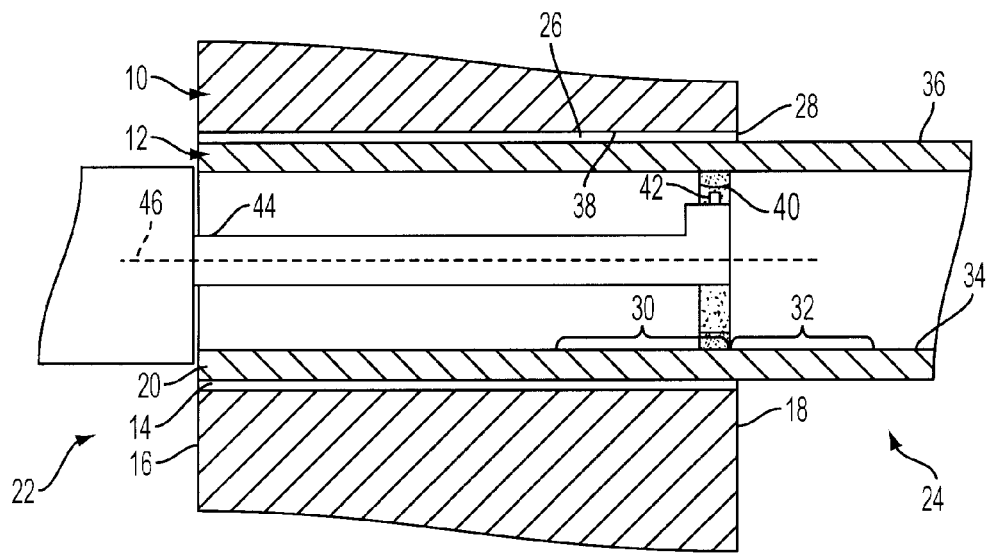
FIG. 1 is a cross-sectional view through a portion of a tubesheet and tube showing a tube prepared for a welding process in accordance with the present invention.

Referring to FIG. 1, a portion of a tubesheet 10 and tube 12 for a heat exchanger is illustrated. The tubesheet 10 is a planar sheet-like member that is typically formed with a plurality of relatively closely spaced holes 14. The tubesheet includes a front or first side 16 and a back or second side 18, and the tube 12 includes an end 20 that extends into the tubesheet 14, past the second side 18. to a location substantially flush with the first side 16. The tubesheet 10 may form a wall between adjacent fluid chambers 22, 24 in a heat exchanger such as a combustion turbine rotor cooling air kettle boiler. The chamber 22 may comprise an air chamber and the chamber 24 may comprise a water chamber, and the tube 12 extends through the chamber 24 to a further tubesheet (not shown) at an opposite end of the tube 12. Air flows through the tube 12 from the chamber 22 to a similar chamber (not shown) at an opposite end of the tube 12, and water in the chamber 24 flows across the tube 12 to provide heat exchange between the air and the water.

A crevice 26 is formed between the tube 12 and the hole 14 in the tubesheet 10. In accordance with the present invention, it is desirable to provide joint between the tubesheet 10 and the tube 12 that both rigidly attaches the tube 12 to the tubesheet 10 and forms a seal to prevent water from passing from the chamber 24 to the crevice 26, in that corrodants in water passing into the crevice 26 could potentially cause corrosion and transgranular cracks formed in the microstructure of the tubesheet 10 and tube 12. In particular, corrodants in water used in the heat exchanger may cause chloride crevice stress corrosion, which can result in leaks developing between the tubesheet 10 and the tube 12.

The construction provided by the present invention prevents entry of water and associated corrodants into the crevice 26 by forming a weld joint at a junction location 28 where the tube 12 enters the tubesheet 10 at the second side 18 of the tubesheet 10. However, as has been noted above, certain difficulties have been noted in the prior art when attempting to form a weld from an interior portion of the tube 12 at this location. Specifically, while the tubesheet 10 comprises a substantial heat sink for absorbing and distributing heat from the weld location, the tube 12 typically experiences substantial localized heating, having significantly less heat sinking ability than the tubesheet 10. For example, the tubesheet 10 may comprise a sheet of 304L stainless steel having a thickness between the first and second sides 16 and 18 of 0.75 in. to 4.0 in. (19.1 mm to 101.6 mm), and the tube 12 may comprise a similar material to the tubesheet 10, having an outer diameter of 1.0 in (25.4 mm) and a wall thickness of 0.062 in (1.6 mm). Further, while the portion of the tube 12 extending through the hole 14 between the first and second sides 16, 18 may benefit from the heat sinking capabilities of the tubesheet 10, the portion of the tube extending from the junction location 28, i.e., into the air adjacent to the second side 18, will experience substantially less heat sinking capability.

The different heat sinking areas are illustrated in FIG. 1, where a first or overlapping area 30 comprises a portion of the tube 12 adjacent to the second side 18 and in overlapping relation to the tubesheet 10, and the tubesheet 10 operates as a substantial heat sink to welding power applied to the interior of the tube 12 at this location. In contrast, a second or exposed area 32 comprises a portion of the tube 12 that extends from the junction location 28 with the tubesheet 10 and is an exposed area, with air around the tube 12 as a relatively poor heat sink. Hence, an asymmetrical heat sinking interface is defined along the tube 12, as defined by different (asymmetrical) heat sinking characteristics on either side of the junction location 28. With regard to providing a weld at this location, the asymmetrical heat sink defined across the junction location 28 into the areas 30 and 32 presents a problem in that, in providing sufficient weld power to penetrate the tube 12, bridge the crevice 26 and fuse into the tubesheet 10, the exposed area 32 of the tube 12 will not readily dissipate the heat, resulting in this area melting and forming a hole in the tube 12. If the weld power is reduced to avoid melting of the exposed area 32, insufficient heat will be provided to penetrate the wall thickness of the tube 12, as heat is dissipated by the tubesheet 10 in the overlapped area 30, and either a weld will not be formed or will be of unacceptable quality.

The present invention provides a method of forming a weld at an asymmetrical heat sink area such as at the above-described junction location 28 between a tubesheet 10 and an associated tube 12. In accordance with an aspect of the invention, the tube 12 may be placed in association with the hole 14 in the tubesheet 10 such that an open end of the tube 12 defined by the end 20 is adjacent to the first side 16 of the tubesheet 10, and is preferably substantially flush with the first side 16. The tube 12 extends through the tubesheet 10 and outwardly from the junction location 28 at the second side 18. The tube 12 comprises an inner welding side 34 and an outer contact side 36. The outer side 36 of the tube 12 and an adjacent surface 38 of the hole 14 in the tubesheet 10 define the crevice 26.

In accordance with the process of the present invention, a penetration enhancing compound, generally depicted at 40, is applied to the tube inner side 34 at a location adjacent to the junction location 28 between said tube outer side 36 and said tubesheet second side 18. The penetration enhancing compound 40 is provided in a localized area on the tube inner side 34, preferably along a predefined ring-like area around the inner circumference of tube inner side 34. A non-consumable electrode 42 is located through the open end 20 of the tube 12 to a position adjacent to the penetration enhancing compound 40 location on the tube inner side 34, i.e., adjacent to the junction location 28. An electric welding power is applied to the electrode 42 to create an arc between the electrode 42 and the tube inner side 34, causing welding heat to penetrate the tube 12 to the contact side 36, across the crevice 26 and into the tubesheet adjacent surface 38 to form a weld joint between the tube 12 and the tubesheet 10 at the junction location 28.

It should be noted that the step of providing the penetration enhancing compound 40 may be performed at any time prior to the step of applying the arc welding power. For example, the penetration enhancing compound 40 may be applied to the tube 12 prior to locating the tube 12 in association with the tubesheet 10.

Figure 2:
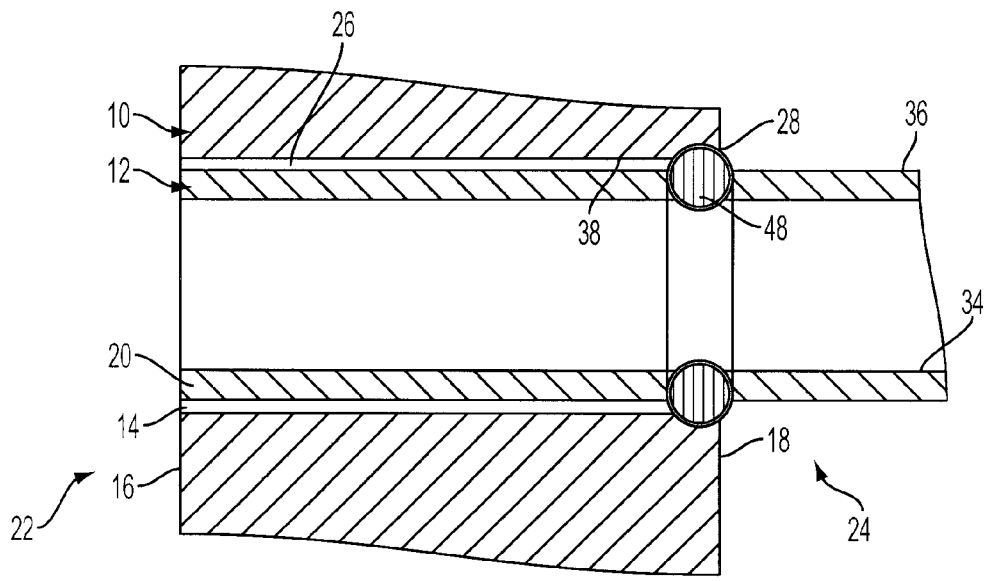
FIG. 2 is a cross-sectional view showing a weld joint formed between a tube and tubesheet by a welding process in accordance with the present invention.

The electrode 42 is preferably mounted on a rotatable or orbital electrode support 44. The electrode support 44 may be rotated about a central axis 46 aligned with the longitudinal center of the tube 12 to cause a weld 48 to be formed around the inner circumference of the tube inner side 34, as shown in FIG. 2. The electrode 34 and electrode support 44 may comprise a known welding system, and preferably comprises a TIG welding system. For example, such a welding system may comprise a model TS 12-90 available from AP Automation of San Diego, Calif., or a model P 20 Orbital Weld Head available from Orbimatic of Buseck, Germany.

The penetration enhancing compound 40 comprises flux that creates a key-hole effect, substantially facilitating focusing of the welding heat to a particular location on the tube 12 adjacent to the joint location 28, thereby limiting the amount of welding heat that is propagated to the exposed area 32. That is, the penetration enhancing compound 40 influences the direction of the welding heat to penetrate through the tube 12 to the contact surface 36 to provide welding heat to the tubesheet 10 adjacent surface 38 to a greater extent than it is provided to the exposed area 32.

The mechanism by which the penetration enhancing compound 40 operates to improve penetration is believed to be characterized by the following: a) dissolved flux affects the weld pool surface tension coefficient to increase with temperature, resulting in radially inward convective circulation and resulting deeper penetration (also known as Marangoni effect); b) the welding arc is constricted by electron attachment to flux vapor, containing e.g. oxygen, resulting in higher weld current density and deeper penetration; c) the flux generally lowers the weld pool surface tension and causes greater weld pool depression by the arc force, resulting in deeper penetration; and/or d) the flux acts to electrically insulate the surface and block current at the outer portions of the arc resulting in higher weld current density (constriction) and deeper penetration.

The penetration enhancing compound 40 may be generally characterized as a mixture of oxides, and may be any one of a variety of commercially available fluxes. Examples of acceptable fluxes are: EWI CS-235, Liburdi Engineering Fi-600 or NI-139, Swagelok SWS-Flux-1 and Paton Welding Institute PATIG S-A or PATIG N-A.

Figure 3:
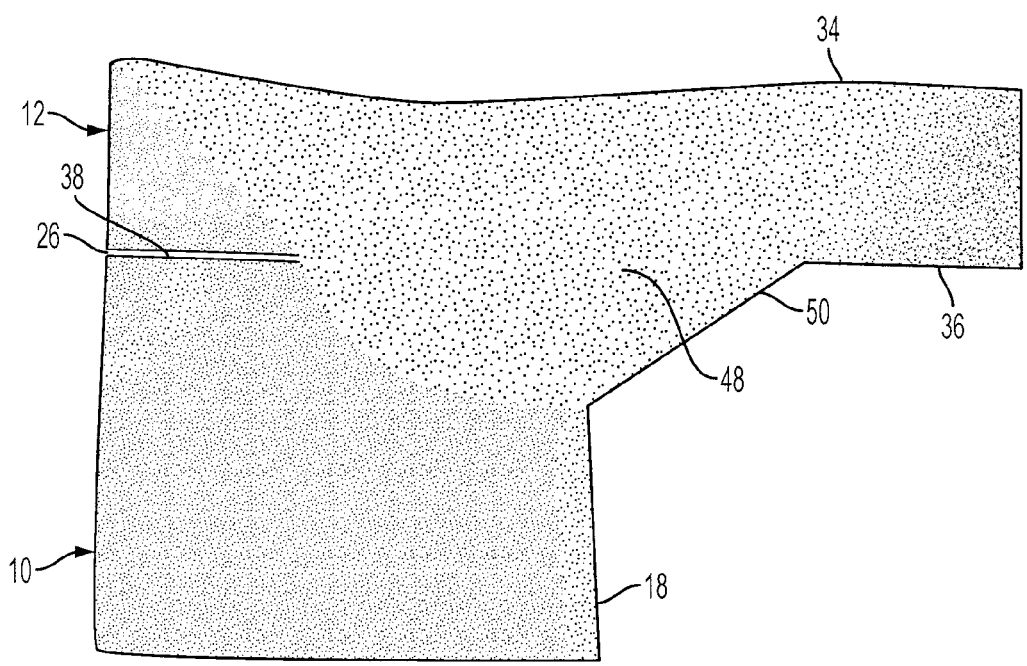
FIG. 3 is a cross-sectional view illustrating a photomicrograph through a portion of a weld formed in accordance with the present invention and penetrating through a simulated tube to a simulated tubesheet.

FIG. 3 illustrates the appearance of a weld 48 that may be formed by the present process, as simulated by a thin sheet, simulating the tube 12, and a thick plate, simulating the tubesheet 10. It can be seen that the weld 48 extends through the simulated tube 12 and into the surface 38 of the simulated tubesheet 10, forming a fillet 50 to the outer surface 36 of the tube 12. The weld 48 eliminates the crevice 26 at the second side 18 of the tubesheet 10 and thereby prevents fluid from entering the crevice 26.

Figure 4:
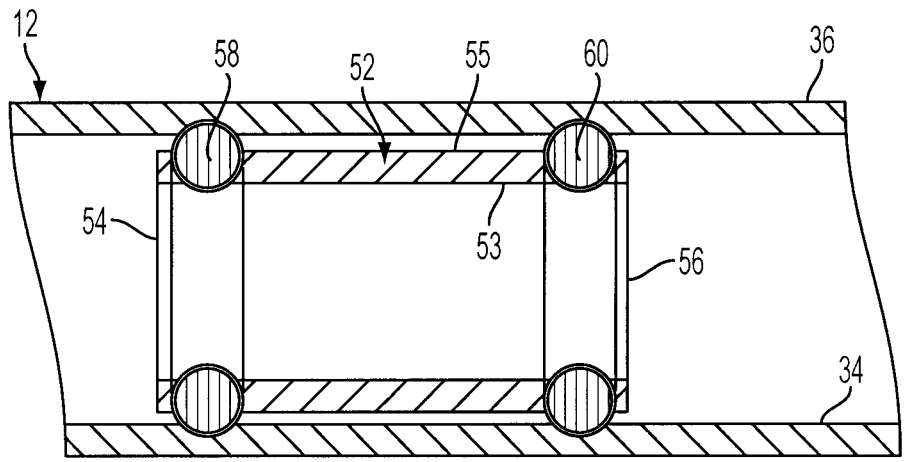
FIG. 4 is a cross-sectional view showing a weld joint formed between a tube and an interior sleeve by a welding process in accordance with the present invention.

In an alternative process using the present method, a sleeve may be welded to the tube 12, such as may be performed to bridge a defect in the tube 12. For example, a sleeve 52 such as a stainless steel sleeve having a diameter smaller than the tube 12 may be inserted inside the tube 12, as shown in FIG. 4. The outside of the tube 12 may have various heat sinking capabilities along its length due to various conditions such as surrounding sludge, surrounding water, a surrounding baffle member or other conditions that may affect the transfer of heat. In this case, the penetration enhancing compound may be applied to an inner or welding surface 53 of the sleeve 52, such as around the inner circumference adjacent to either end 54, 56. A welding electrode is then aligned with the locations of the compound, and the penetration enhancing compound facilitates penetration of the weld through the sleeve 52 to the tube 12 to form welds 58, 60 between an outer surface 55 of the sleeve 52 and the inner surface 34 of the tube 12. Hence, the welding power provided to the electrode may be set in accordance with the known requirements for penetrating the sleeve 52 using the penetration enhancing compound 40 and problems associated with the unknown heat sinking capability of the tube 12 may be avoided.

Figure 5:
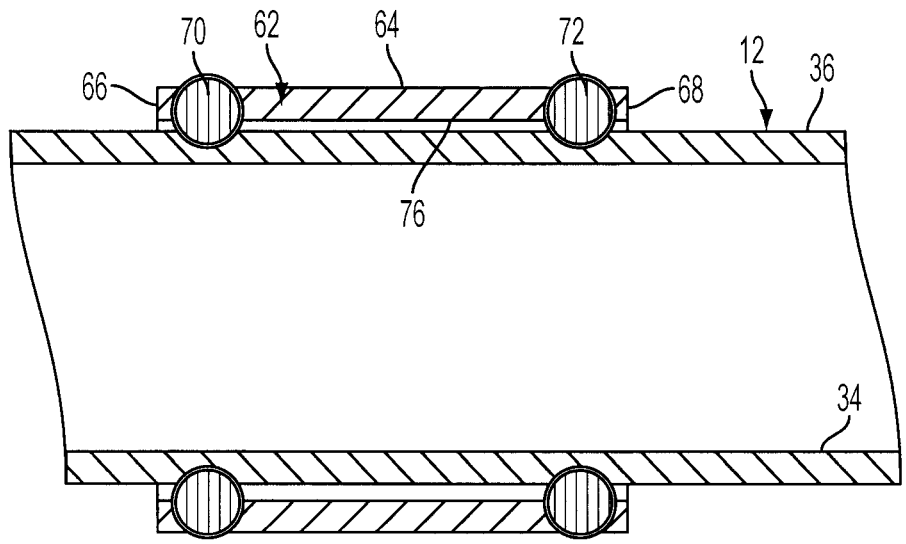
FIG. 5 is a cross-sectional view showing a weld joint formed between a tube and exterior sleeve by a welding process in accordance with the present invention.

Referring to FIG. 5, an alternative configuration of the structure shown in FIG. 4 is illustrated, where a sleeve 62 having a larger diameter than the tube 12 is located over the tube 12. In this embodiment, an outer or welding surface 64 of the sleeve 62 may be provided with penetration enhancing compound encircling the sleeve 62 adjacent to either end 66, 68 of the sleeve 62. A welding electrode is then aligned with the locations of the penetration enhancing compound adjacent the outer surface 64 of the sleeve 62 to form welds 70, 72 between an inner surface 76 of the sleeve 62 and the outer surface 36 of the tube 12.

In the embodiments of FIGS. 4 and 5, variations in the weld due to asymmetrical heat sinking conditions between the tube 12 and the respective sleeves 52, 62 is substantially avoided or reduced through use of the penetration enhancing compound. In particular, providing the penetration enhancing compound on the side of the sleeve 52, 62 at the weld location facilitates penetration of heat from the welding arc through the wall of the sleeve 52, 62 to the tube 12, regardless of variations in the heat sinking capability of the tube 12.

It should be noted that although the present invention has been described with particular reference to welding of stainless steel components, the method of the present invention is equally applicable to welding of other materials. In particular, the present invention may be used to facilitate welding of components formed of materials having high thermal conductivity and materials having large differences in thermal conductivity. Similarly, the method of the present invention may facilitate joining of components having variable heat sink substances in contact with them.

Further, the method described herein may be used to facilitate welding of components having asymmetrical heat sinking capabilities resulting from different thicknesses of the components. For example, during welding of a thin sheet of metal to a thick sheet of metal, an asymmetrical heat sinking condition may exist, particularly where the thin sheet extends beyond an edge of the thick sheet of material. A welding operation in accordance with the present invention may be performed by providing a line of penetration enhancing compound on the thin sheet of material adjacent to and on an opposite surface of the thin sheet from the surface facing and adjacent to the edge of the thick sheet of material. Providing a welding arc at the location of the penetration enhancing compound will produce a welded joint at the edge of the thick sheet of material while avoiding formation of a hole in the thin sheet of material where it extends past the edge of the thick sheet of material.

It should additionally be noted that although the method of the invention is described with specific reference to a TIG welding process, the method may be equally applicable to other arc welding processes, and may be implemented in a laser welding process. In addition, although not necessary for the preferred embodiment of the present invention, a filler material may be included in the location of the weld to further facilitate the welding operation.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of welding two members at a location having asymmetrical heat sinking characteristics, the method comprising:

associating a first member with a second member, said second member defining a first area and a second area in relation to said first member, said first area comprising an area where said second member overlaps with said first member and said second area comprising a non-overlapping area of said first and second members, said first area having a greater heat sinking capability than said second area;

said first member having a first member welding side and a first member contact side, said first member contact side being in close association with and facing toward an adjacent surface of said second member in said first area;

applying a penetration enhancing compound to said first member welding side, opposite from said first member contact side, adjacent to a junction location between said first area and said second area; and heating said first member at the penetration enhancing compound by positioning a welding electrode adjacent to said first member welding side, said penetration enhancing compound located between said welding electrode and said first member welding side, and performing an arc welding by providing an arc welding power from said welding electrode to said first member welding side, said welding power causing welding heat to penetrate said first member from said first member welding side to said first member contact side and to heat said adjacent surface of said second member to effect formation of a weld joint between said first member contact side and said adjacent surface of said second member.

2. The method as set out in claim 1, wherein said second member is thicker than said first member, thereby providing said second member with a greater heat sinking mass than said first member.

3. The method as set out in claim 1, wherein said second member comprises a tube member and said first member comprises a tubular sleeve located in overlapping relation to said tube member.

4. The method as set out in claim 1, wherein said arc welding comprises a TIG welding process.

5. The method as set out in claim 2, wherein said first member comprises an exposed surface of said first member in said second area, said weld joint being formed at said junction location between said first and second areas.

6. The method as set out in claim 3, wherein said tubular sleeve comprises an inwardly facing surface defining said welding side and said tubular sleeve is located within said tube member, and said penetration enhancing compound is applied to said inwardly facing surface of said tubular sleeve.

7. The method as set out in claim 5, wherein said second member comprises a tubesheet having a first side and a second side, said first member comprises a tube member extending into said tubesheet past said junction location at said tubesheet second side and having an open end located at said tubesheet first side, said weld joint being located at said tubesheet second side distal from said open end of said tube member.

8. The method as set out in claim 7, wherein said weld joint is formed around the periphery of said tube member.

9. The method as set out in claim 7, wherein said arc welding comprises a TIG welding process including inserting a non-consumable electrode through said open end of said tube member to a location adjacent to said penetration enhancing compound.

10. The method as set out in claim 3, wherein said tubular sleeve comprises an outwardly facing surface defining said welding side and said tubular sleeve is located surrounding said tube member, and said penetration enhancing compound is applied to said outwardly facing surface of said tubular sleeve.

11. A method of welding a tube member to a boiler tubesheet, the method comprising:

associating the tube member with a hole through the tubesheet;

the tube member having an inner welding side and an outer contact side, said tube member outer side being in close association with and facing toward an adjacent surface defined by said hole in the tubesheet;

applying a penetration enhancing compound to said tube member inner side, opposite from said tube member outer side; and heating said tube member at the penetration enhancing compound by positioning a welding electrode adjacent to said tube member inner side, said penetration enhancing compound located between said welding electrode and said tube member inner side, and performing an arc welding by providing an arc welding power from said welding electrode to said tube member inner side, said welding power causing welding heat to penetrate said tube member from said tube member inner side to said tube member outer side and to heat said tubesheet to effect formation of a weld joint between said tube member outer side and said adjacent surface of said tubesheet.

12. The method as set out in claim 11, wherein said tubesheet comprises a first side and a second side, said tube member includes an open end located adjacent to said first side and extends through said tubesheet past said second side, said weld joint being located at a junction of said tube member outer side and said tubesheet second side.

13. The method as set out in claim 12, wherein said weld joint is formed around the periphery of said tube member.

14. The method as set out in claim 13, wherein said arc welding comprises a TIG welding process including inserting a non-consumable electrode through said open end of said tube member to a location adjacent to said penetration enhancing compound.

15. A method of welding a tube member to a tubesheet, the method comprising:

the tubesheet having a first side and a second side, and a hole extending between said first and second sides;

the tube member including an open end and having an inner welding side and an outer contact side;

associating the tube member with the tubesheet by positioning the tube member open end substantially flush with the tubesheet first side and with the tube member extending through the tubesheet past the second side;

applying a penetration enhancing compound to said tube member inner side, opposite said tube member outer side, at a location adjacent to a junction between said tube member outer side and said tubesheet second side;

locating a non-consumable electrode through said open end of said tube member to a location adjacent to said junction between said tube member outer side and said tubesheet second side, said penetration enhancing compound located between said welding electrode and said tube member inner side; and heating said tube member by using said electrode to perform an arc welding by providing an arc welding power to said tube member inner side, said welding power causing welding heat to penetrate said tube member from said tube member inner side to said tube member outer side and to heat said tubesheet to effect formation of a weld joint at said junction between said tube member outer side and said tubesheet second side.

16. The method as set out in claim 15, wherein said tube member is not welded to said tubesheet at said tubesheet first side.

17. The method as set out in claim 15, wherein said arc welding comprises a TIG welding process.

\* \* \* \* \*